United States Patent Office 3,409,502
Patented Nov. 5, 1968

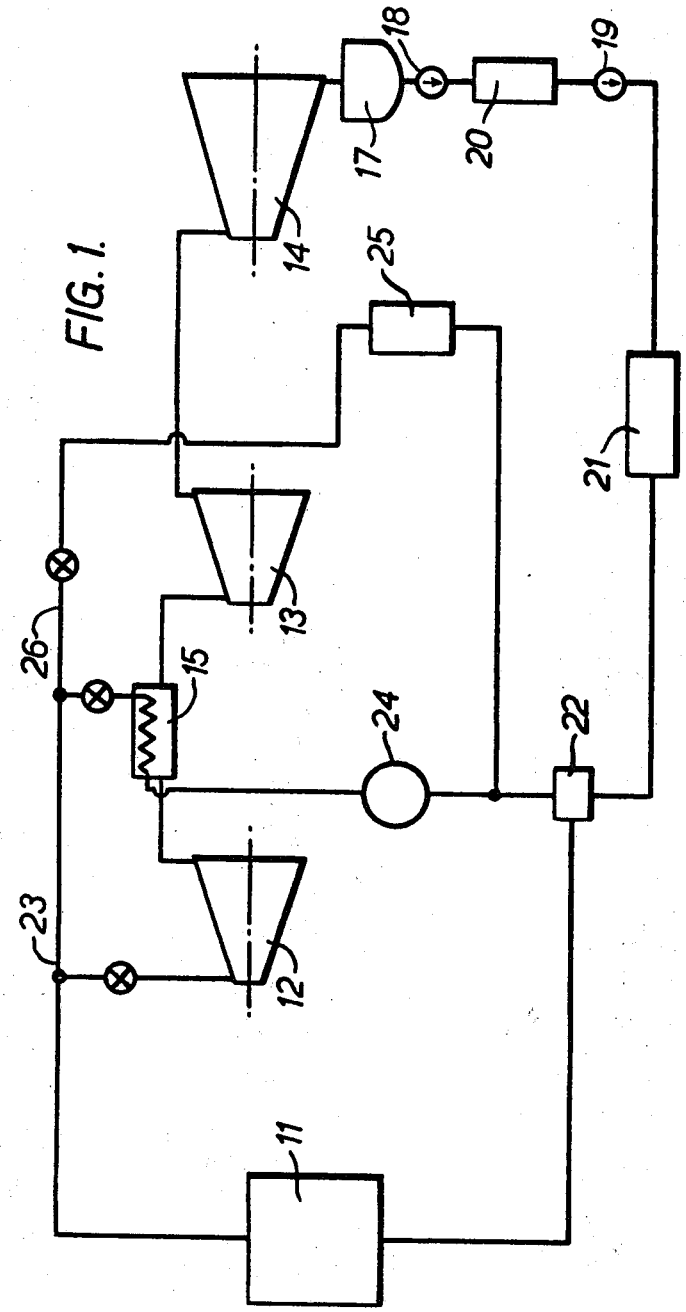

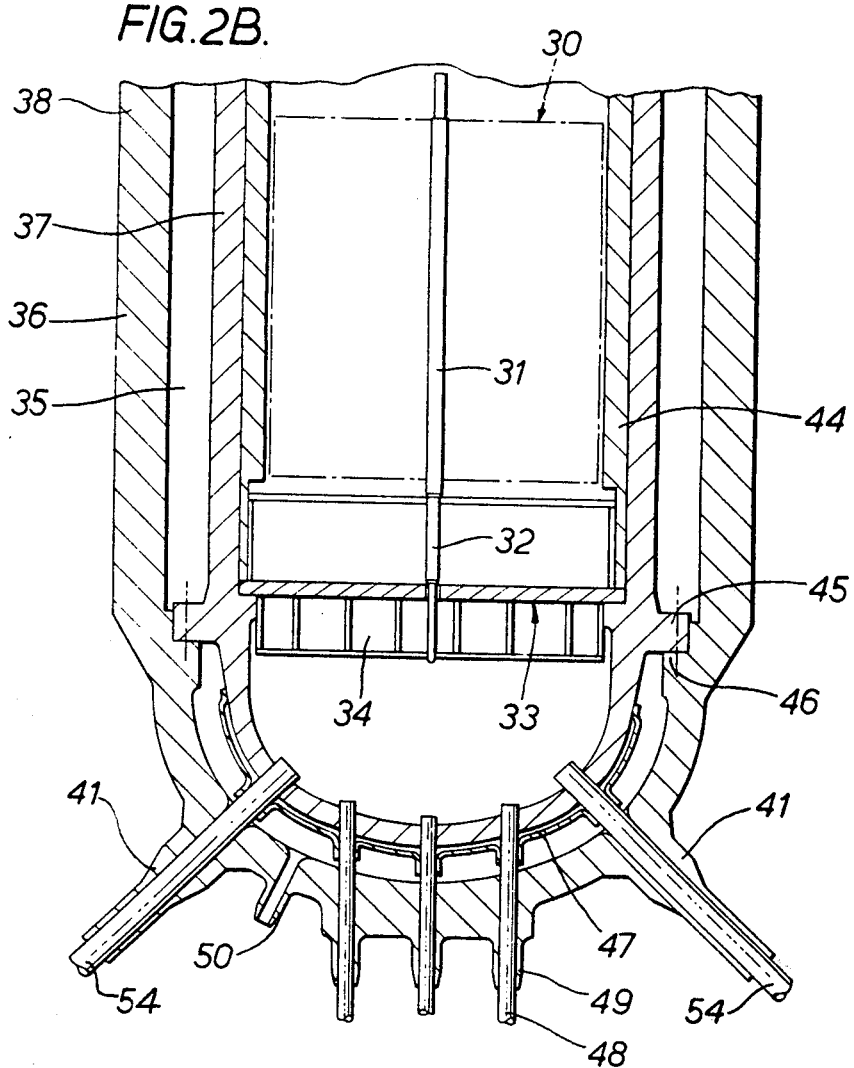

3,409,502
FAST NUCLEAR REACTOR COOLED BY
SUPERCRITICAL STEAM
Allan Barker, Chester, England, assignor to United Kingdom Atomic Energy Authority, London, England
Continuation of application Ser. No. 342,971, Feb. 6, 1964. This application Dec. 8, 1966, Ser. No. 600,271
Claims priority, application Great Britain, Feb. 11, 1963, 5,579/63; Oct. 19, 1963, 41,221/63
5 Claims. (Cl. 176—40)

ABSTRACT OF THE DISCLOSURE

A fast nuclear reactor cooled by steam at supercritical pressure. Features of the reactor include a heat rating of not less than 8 mw. per cubic foot of core, heat transfer surface area of at least 80 square feet per cubic foot of fuelled core, cylindrical, elongated fuel elements, preferably sheathed ceramic fuel, of approximately diameter 0.2 inch, and a temperature rise of coolant across the core of less than 200° C. A power plant including the core and including an arrangement for dividing the coolant from the core into two streams, one of greater mass flow for supplying heat to a reheater and the other stream of lesser mass flow for driving a turbine This application is a continuation of my previous application, Ser. No. 342,971, filed Feb. 6, 1964, now abandoned.

Figure 2A:
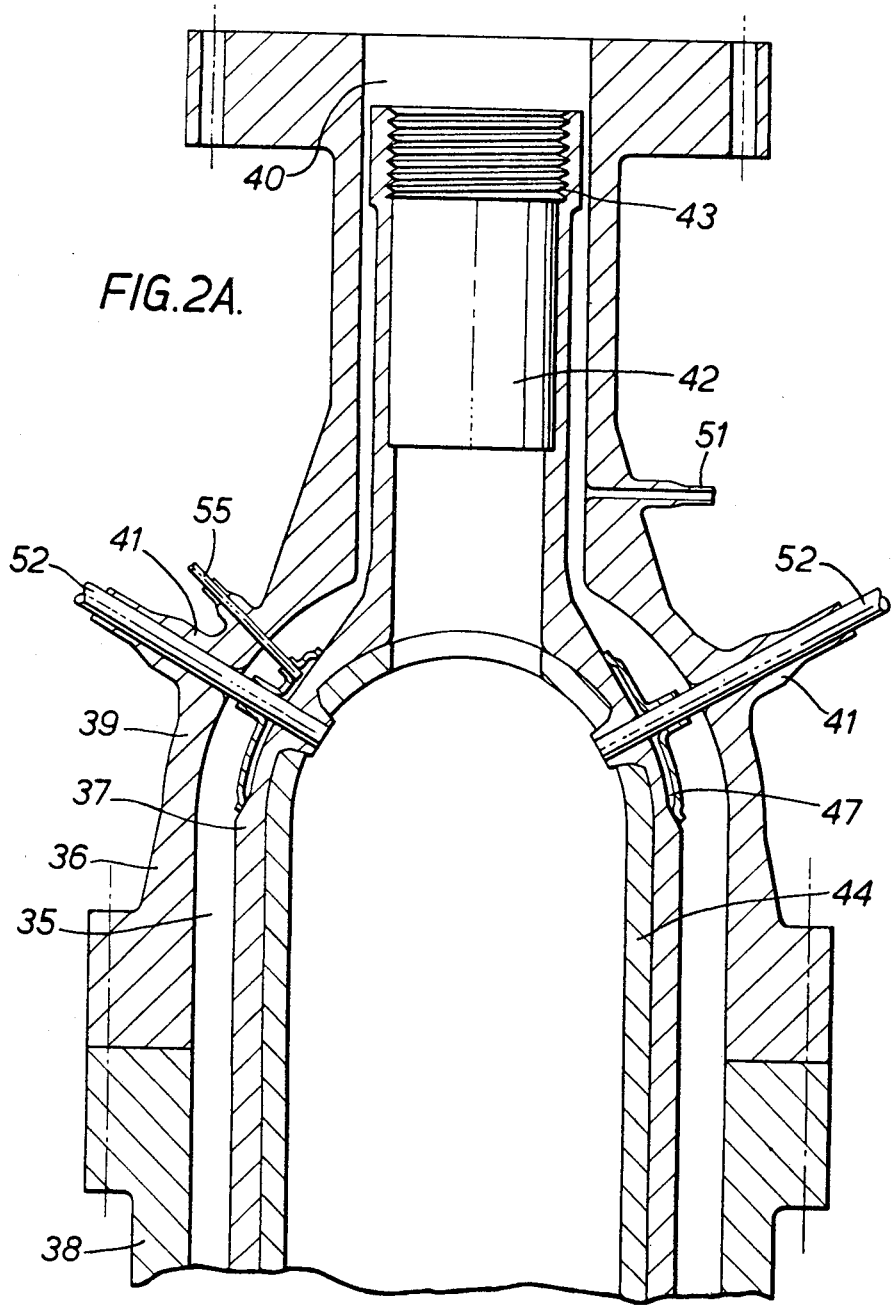

Advanced steam cycles of the present time for the generation of power employ reheat between turbines, such reheat being provided by returning partially expanded steam to the boiler or by throttled steam which has by-passed the higher pressure expansion stages of the turbines. However, such reheat can be provided by recirculating steam at boiler pressure and a power plant based on this cycle therefore comprises a plurality of steam turbines with at least one intermediate reheater, a steam line for passing directly to the reheater a portion of the steam supply, a water feed pump, and a mixer for combining the recirculating steam from the reheater with the delivery of the pump. Such plant will be referred to hereinafter as "of the type set forth." The cycle efficiency is increased the higher the pressure of the steam supply and consequently pressures above critical are currently contemplated. With a supercritical pressure it is possible to obtain a cycle efficiency of over 43% in a power plant of the type set forth.

The use of a nuclear reactor as the heat source in a power plant of the type set forth has already been proposed in British patent specification No. 849,958. There it is contemplated that the maximum steam pressure employed is below the critical pressure. A typical figure is about 2,000 p.s.i.a. for the steam supply to the turbines. At this order of pressure difficulties can arise due to the desirability of the coolant fluid being of one single phase throughout the reactor core in order that moderation and heat transfer may be uniform within acceptable limits. Consequently the fluid entering the core as coolant should be entirely vapour, that is to say, steam. The higher one makes the pressure in the interests of cycle efficiency the higher becomes the saturation temperature and since there is a limit imposed by materials of construction on the temperature at which the fuel elements in the core can operate the result is a corresponding reduction in the temperature difference of the steam at the inlet and outlet. Reduction of this temperature difference restricts the latitude available in the designing of the core.

If it were possible to adopt a supercritical pressure in the core these difficulties would be avoided because under such pressure any distinction of phase disappears. Also, at the same time, the cycle efficiency would be enhanced and maximum cooling capability would be achieved. The advantages to be gained by supercritical conditions in the reactor are therefore considerable but previously they have been regarded as not easily attainable because of the substantial problems arising from the containment of such high pressures on the scale of a nuclear reactor. With regard to terminology, it is to be borne in mind that the saturation temperature of water subject to increasing pressure reaches its maximum value of 374° C. (the critical temperature) at the critical pressure of 3,206 p.s.i.a. At a pressure higher than the critical there is no corresponding saturation temperature and although it is common to refer to supercritical "steam" there is in fact no change of phase but only a change of density as the temperature is increased above the critical. In this specification the term "supercritical steam" is used without implying of itself any limitation on temperature.

The present invention is based on the appreciation that a feasible nuclear reactor system is afforded by the combination of three factors, namely (a) absence of installed moderation to give in effect a so-called fast reactor and consequently compactness to facilitate containment, (b) a large area of fuel element heat transfer surface per unit volume of core, and (c) supercritical steam for cooling the core, the cooling capability secured by such steam serving in conjunction with the large area of heat transfer surface to balance the heat output. For the purposes of this specification a fast reactor is to be understood as being capable of sustaining a fission chain reaction with a neutron flux in which the average of the neutron energy spectrum exceeds 1000 electron volts.

Thus, particularly for use as the heat source in a power plant of the type set forth, the invention provides a fast nuclear reactor in which fuel elements forming a core present in each cubic foot of fuelled core at least 80 square feet of fuel element heat transfer surface and in which a feed pump for supplying water coolant to the core is adapted to pressurise the coolant to a supercritical pressure. Although the figure of 80 square feet of fuel element heat transfer surface is not critical, it is a limitation which is accepted herein by way of definition of the aforementioned feature (b) in the context of commercial power producing fast reactors; a typical heat rating for such a reactor is between 8 and 10 mw. per cubic foot of core. On the assumption that the coolant volume fraction in the core is one third, the surface area figure quoted previously is equivalent to the fuel elements having an outer diameter of 0.4 inch when of a plain cylindrical shape. A larger surface area is generally to be preferred as by reducing the outer diameter in the case of cylindrical elements or by providing an extended heat transfer surface, for example, by the use of fins. Although the use of metallic fuels is not excluded, it is particularly convenient to adopt a fuel which is entirely ceramic because on account of its low thermal conductivity relative to the metallic forms it must necessarily be in thin sections to limit the centre temperature. A plain cylindrical element containing fuel in ceramic form is typically of an outer diameter of 0.2 inch.

One embodiment of the invention therefore comprises generally cylindrical elongated fuel elements of an outer diameter approximately 0.2 inch forming a core, a ceramic fuel contained in the elements, such fuel being enriched with plutonium for sustaining a fast fission chain reaction in the core, and means to circulate over the elements a water coolant at supercritical pressure. Preferably the last-mentioned means is adapted in conjunction with feed heating means to force coolant through the core at such a degree of preheat and in such quantity that the rise in temperature of the coolant across the core is less than 200° C. Such limitation implies a high temperature in the coolant at the core inlet and hence a low coolant density; in this way the moderating properties of the coolant are minimised so as to retain an acceptable measure of the breeding characteristic of fast reactors. With regard to the ceramic fuel containing elements previously specified, it is to be understood that the ceramic may be dispersed in a non-fissile material, as in the case of a cermet.

A fast reactor core with a heat rating of 1000 mw. need be no more than five feet diameter in the case of a shape approximating to a right cylinder. When allowance is made for a surrounding blanket of breeder elements and a layer of shielding the inner diameter of a pressure vessel to contain the core becomes about ten feet. The construction of such a vessel to the required standards is within the range of present techniques as will be explained more fully subsequently.

The advance represented by the invention in the art of fast reactors should also be noted. It has been generally accepted that the coolant for such reactors should be a liquid metal, usually sodium or an alloy thereof with potassium.

These alkali metal coolants cannot conveniently be employed as the working fluid in a prime mover for converting the heat output of the reactor into useful power. In practice, therefore, it is inevitable that the prime mover will be linked with the heat source represented by the reactor core through an indirect cycle, that is to say, a cycle involving transfer of the heat in the liquid metal coolant to an appropriate working fluid, usually water. A further disadvantage is that the previously mentioned liquid metals react violently with water; thus, unless satisfactory guarantees can be given against leakage it becomes necessary to include in addition an intermediate liquid metal circuit between the water and the liquid metal cooling the core so that any possibility of the reaction taking place does not also involve the radioactivity associated with the liquid metal cooling the core. Besides the expense in constructional costs of these indirect cycles, they detract from the initial objective of compactness and also introduce temperature drops in transferring from one medium to another which require the fuel elements constituting the core that they operate at a surface temperature considerably hotter than the maximum temperature achieved in the working fluid.

It will be appreciated that the invention makes possible the avoidance of indirect cycles for a fast reactor.

The invention will be further described with reference to the accompanying drawings in which is shown, by way of example, one form of fast reactor in accordance with the invention included in power plant of the type set forth.

Figure 3:
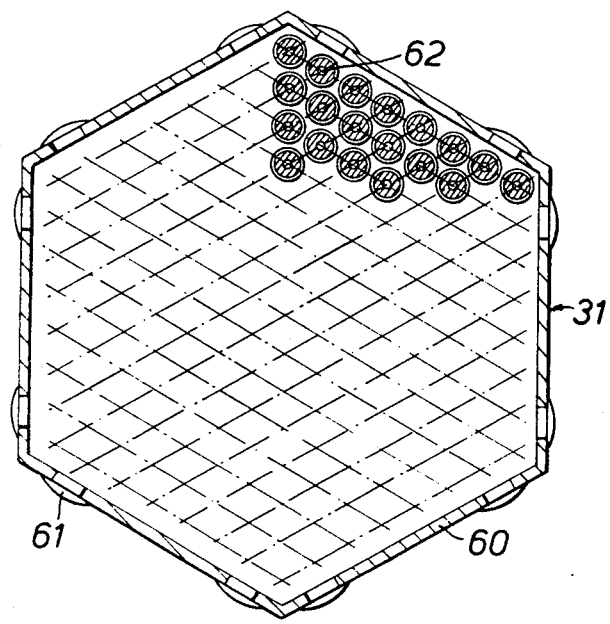

In the drawings:

FIGURE 1 is a diagram of the plant,

FIGURES 2A and 2B, when joined together, give a vertical section through the reactor, and FIGURE 3 is a plan view, in section, of a fuel element assembly used in the reactor core.

The power plant as seen in FIGURE 1 comprises a fast reactor 11, three serially arranged steam turbines 12, 13 and 14 with single reheat represented by the intermediate reheater 15, a steam condenser 17, and a feed water system including two feed pumps 18 and 19, two blocks of feed heaters 20 and 21, for which the heat may be obtained by tapping steam from the turbines in well-known manner, and a mixer 22.

Coolant leaving the reactor is divided at 23 into one stream passed to the turbines and another, of greater mass flow, recirculated in sequence through the re-heaters and from thence to the mixer where it is introduced into the feed water, this second stream being recirculated by a circulator 24 upstream of the mixer.

By means of the feed pumps, the feed water derived from the steam condenser is pressurised to a supercritical pressure, say 3,750 p.s.i.a., and the mixing effected at 22 yields a supercritical temperature in the coolant which is passed through the reactor core. It is ensured by choosing a sufficiently high inlet pressure that the pressure is still supercritical on leaving the core. As an illustration of the division effected in practice at 23 there might be required for a core rated at 1,132 mw.(t.) (equivalent to a net output of 500 mw.e.) a steam mass flow of $10.08 \times 10^6$ lbs. per hour and of this only $3.26 \times 10^6$ lbs. per hour, that is to say, less than a third, might be passed to the turbines. As a general rule, therefore, a major portion of the steam supply, in terms of mass flow, is recirculated.

In the illustration of the reactor 11 in FIGURES 2A and 2B, only those parts are shown which are significant for the present invention. A core formed of fuel elements has the shape overall of a right cylinder as indicated by the dot and dash outline 30 this core has its fuel elements in a large number of juxtaposed upright fuel element assemblies, such as the one indicated at 31, each having an elongated tubular outer casing or wrapper in which is secured an array of fuel elements in the form of fuel pins. The lower ends of these tubular casings are extended in the form of hollow spikes 32 which fit into a grid structure 33, the latter defining a coolant plenum 34 which is in communication with the casing interiors through lateral openings in the spikes.

In keeping with the shape of the core, a pressure vessel enclosing the core is also cylindrical but has a length rather more than double the length of the core so that fuel element sub-assemblies lifted above the core volume can be moved laterally within the vessel for charge and discharge purposes.

It will be seen that the vessel is double-walled with an interspace 35 between the outer wall 36 and the inner wall 37. The outer wall is a containment made up of three separable sections to withstand the full design pressure of, say, 3,600 p.s.i.a., these sections being a main lower section 38, an upper section 39 having a bolted flange joint with the lower section, and a cover plate (not shown) for sealing a flanged top opening 40 in the upper section. Both of the upper and lower sections are prefabricated of thick forged rings which are united by butt welds; electro-slag welding is appropriate on account of the thickness, which may be eight inches or more. Nozzles such as 41 for accommodating coolant ducts penetrate perpendicularly through domed portions of the upper and lower sections. For the 500 mw.e. design under consideration the inner diameter of the outer containment is 12 feet.

The inner wall 37 is a containment of similar shape and construction so as to be capable of providing a corresponding degree of short-term pressure integrity; its necked upper end is closed by a shield plug 42 which is secured in position by a screw thread connection 43. The part of the inner wall adjacent and above the core is lined on its internal surface with mild steel neutron shielding 44 such that the mild steel lining and the inner wall constitute in conjunction with shielding water between the walls (to be described later) an adequate shield against damage of the outer wall by neutrons. Whereas the outer wall working temperature is in the region 250 to 350° C., the working temperature for the inner wall is 400° C., or higher, for continuous self-annealing to counter the high neutron flux to which the inner wall is exposed. These temperatures are conveniently made to correspond with the feed water heater and core inlet temperatures respectively. By means of radial lugs 45 projecting at intervals around its circumference, the inner wall is supported on a ledge 46 formed in the bottom of the outer containment.

In alignment with the coolant duct nozzles 41 are penetrations through the inner wall each with a jacketted space 47 surrounding the outer end. The jacket arrangement in the bottom of the inner wall is such that this space is common not only to the coolant duct penetrations in that region but also to the penetrations necessary for control rod entry thimbles 48 by which control elements can be inserted into the core from below, these thimbles being passed through the outer wall by way of nozzles 49 similar to the nozzles 41.

At the bottom of the lower section 38 of the outer wall there are outlet nozzles 50 opening into the interspace 35 and in the upper section 39 there are inlet nozzles 51 from the interspace. By means of these inlet and outlet nozzles a circulation of shielding water at supercritical pressure is maintained through the interspace. A tapping (not shown) taken direct from the coolant supply leaving the feed water heaters may be used for the interspace circulation.

For the purposes of the present example, it is to be assumed that the flow of steam is downwards through the core and therefore ducts 52 are for inlet steam and ducts 54 for outlet steam. Both sets of steam ducts are welded to the nozzles 41, which function as thermal sleeve connections with the outer wall, and are a close fit in the jacketted penetrations of the inner wall. The same arrangement pertains in the case of the control rod entry thimbles 48. Leakage in either direction into the lower pressure jacketted spaces 47 is withdrawn through outlets such 55 (of which only one is shown).

The intention of the pressure containment formed by the inner wall 37 is to retard the rate of depressurisation in the event of a breach of the outer wall. It is postulated that the inner wall in this event will relieve the outer wall of stress and thus, whilst losing pressure itself by leakage, the inner wall will reduce the risk of the breach being extended.

The section of the fuel element assembly 31 seen in FIGURE 3 is taken through the fuel-bearing length of the assembly. The outer casing 60 is hexagonal with protuberances 61 along its length for maintaining slight clearance between adjacent asemblies. Within the casing there are 169 fuel pins disposed on a triangular pitch of 0.28 inch, each pin being plain cylindrical with an outer diameter of 0.23 inch so that the spacing between pins for coolant flow is 0.05 inch. Each fuel pin is sheathed with metal of a wall thickness of 0.015 inch, the sheating being of stainless steel or one of the high strength alloys based on chromium and nickel. The fuel itself is of annular shape so as to form a central void space 62 for the collection of fission product gases and in composition it is a mixture of the oxides of uranium and plutonium, the enrichment being represented by an atomic ratio of the plutonium to uranium plus plutonium of 15.1% in an inner region of the core and 20.8% in an outer region of the core. Based on assemblies according to FIGURE 3, the fuelled portion of the core is composed of 36.8% coolant space, 27.5% fuel, 28.8% structural material such as sheating, and 5.9% void space.

For a single pass of the coolant through the core, a steam outlet temperature from the core of 1050° F. (565° C.) is obtainable for a surface temperature at the hottest fuel element of about 700° C. The core inlet temperature should be in the range 380° C. to 410° C., the lower limit of this range being chosen above the critical temperature to avoid unduly dense coolant in the core and hence loss of breeding. The upper limit is fixed bearing in mind that increase of the reheater flow demands greater circulating power and hence loss of cycle efficiency. Regarding breeding, the usual practice in fast reactors is followed of breeder blankets around and at both ends of the core. The surrounding, radial blanket is constructed by loading peripheral assemblies 31 with breeder pins instead of fuel pins, while the end blankets are formed by top and bottom length of the fuel assemblies having the fuel pins replaced by breeder pins.

To avoid the positive temperature coefficient to which the use of steam coolant will give rise in the otherwise unmoderated core of the reactor, the known expedient can be adopted of incorporating in the fuel elements some epithermal absorber, such as indium, hafnium, or europium, to counteract the tendency to increase reactivity on flooding the core. This expedient affords the possibility of starting the reactor with the coolant flow through the core at sub-critical temperature. Until an operating supercritical temperature has been achieved, this flow would be by-passed in its entirety through a heat sink 25 (FIGURE 1) by means of a line 26 in parallel with the reheat circuit. This sink may also be used for the dissipation of decay heat from the core after shut down.

It is to be understood that the invention is not limited to the foregoing example. In particular, the outer wall of the illustrated vessel may be constructed of a shell with overlaid layers of band or strip reinforcement. Preferably the layers are of helically wound interlocking strip, in which case the shell thickness can be no more than a quarter of the total. A further modification, which is aimed to reduce heating of the inner wall of the vessel, is the provision beneath the core of a baffle which in effect forms a hot box into which the outlet steam ducts and control rod thimbles project, there being between this baffle and the inner vessel wall a clearance which is in communication with a radial clearance around the core so that coolant at inlet temperature can flow through these clearances to a by-pass outlet nozzle penetrating the vessel walls to the hot box clearance.

I claim:

1. A fast nuclear reactor cooled by steam at supercritical pressure having a core capable of generating heat at a thermal rating of at least 8 mw. per cubic foot of fueled core, said core including a plurality of fuel elements provided with heat transfer surfaces which surfaces define a coolant flow space within said core, said fuel elements containing sufficient enriched nuclear fuel to enable a fast fission chain reaction to be sustained in the core in the presence of a steam coolant filling the said coolant flow space at super-critical pressure, the volume of said coolant flow space, and hence the mass of coolant therein, being small enough for the fast fission chain reaction to be sustained notwithstanding the moderating effect of the super-critical pressure steam coolant, means for introducing said steam coolant at supercritical pressure into said coolant flow space and for circulating said steam coolant at super-critical pressure through the said coolant flow space in direct contact with the said heat transfer surfaces, the said heat transfer surfaces amounting collectively in each cubic foot of fuel core to an area of at least 80 square feet thereby to be adequate for the heat generated by the core to be removed by the steam coolant at super-critical pressure as the said coolant is circulated through said coolant flow space.

2. A nuclear reactor according to claim 1 wherein the means for circulating the steam coolant comprises the combination of a feed pump and feed heating means jointly adapted to preheat the coolant to an inlet temperature in the range 380 to 410° C. and to force the preheated coolant at super-critical pressure through the coolant flow space in sufficient quantity for the rise in temperature in the coolant due to removal of the heat generated by the core to be less than 200° C.

3. Power plant having a nuclear reactor according to claim 1 and further comprising a plurality of steam turbines, at least one reheater intermediate the turbines, means to divide the steam coolant heated at super-critical pressure and temperature in the reactor core into two streams, one stream of greater mass flow for supplying heat to the reheater and the other stream of lesser mass flow for driving the turbines, and means for mixing said one stream after discharge from the reheater with coolant being conducted to the coolant flow space in the core.

4. A fast nuclear reactor cooled by steam at super-critical pressure having a core capable of generating heat at a thermal rating of at least 8 mw. per cubic foot of fueled core, said core including a plurality of fuel elements in the form of generally cylindrical elongated fuel pins having an outer diameter of approximately 0.2 inch, the outer surfaces of said fuel pins forming heat transfer surfaces which surfaces define a coolant flow space within said core, said fuel pins containing a ceramic nuclear fuel enriched with plutonium to enable a fast fission chain reaction to be sustained in the core in the presence of a steam coolant filling the said coolant flow space at super-critical pressure, means for introducing said steam coolant at supercritical pressure into said coolant flow space and for circulating said steam coolant at supercritical pressure through the coolant flow space in direct contact with the said heat transfer surfaces on the said fuel pins for removing the heat generated by the core, the said fuel pins being packed together in said core so that (a) the volume of the coolant flow space, and hence the mass of coolant therein, is small enough for the fast fission chain reaction to be sustained notwithstanding the moderating effect of the super-critical pressure steam coolant, and (b) the said heat transfer surface on said fuel pins amounts collectively to an adequate area per unit volume of the core for the heat generated by the core to be removed by the steam coolant at super-critical pressure as the said coolant is circulated through the coolant flow space.

5. Power plant comprising a plurality of steam turbines, at least one reheater immediate the turbines, a feed pump to provide an output of water at super-critical pressure, means for mixing the pump output with steam discharged from the reheater to form a mixed coolant at super-critical pressure, a pressure vessel containing a nuclear reactor core capable of generating heat at a thermal rating of at least 8 mw. per cubic foot of fueled core, said core including a plurality of fuel elements in the form of generally cylindrical elongated fuel pins having an outer diameter of approximately 0.2 inch, the outer surfaces of said fuel pins forming heat transfer surfaces which surfaces define a coolant flow space within said core, said fuel pins containing a ceramic nuclear fuel enriched with plutonium to enable a fast fission chain reaction to be sustained in the core in the presence of a steam coolant filling the said coolant flow space at super-critical pressure, said fuel pins being packed together in said core so that (a) the volume of the coolant flow space, and hence the mass of coolant therein, is small enough for the fast fission chain reaction to be sustained notwithstanding the moderating effect of the super-critical steam coolant, and (b) the said heat transfer surface on said fuel pins amounts collectively to an adequate area per unit volume of the core for the heat generated by the core to be removed by the coolant at super-critical pressure as the said coolant is circulated through the coolant flow space, an inlet into the vessel to pass the coolant into and through the coolant flow space in direct contact with the fuel pins for removing the heat generated by the core, an outlet from the vessel for coolant heated by passage through the coolant flow space, and means to divide the coolant from the outlet into two streams, one stream of greater mass flow for supplying heat to the reheater and the other stream of lesser mass flow for driving the turbine.

References Cited

UNITED STATES PATENTS

| | | | |
|---|---|---|---|
| 3,178,354 | 4/1965 | Vann et al. | 176—37 |
| 3,247,068 | 4/1966 | Schluderberg et al. | 176—18 |
| 3,275,521 | 9/1966 | Schluderberg et al. | 176—18 |

REUBEN EPSTEIN, *Primary Examiner.*